United States Patent
Wakefield

(10) Patent No.: US 6,189,755 B1
(45) Date of Patent: *Feb. 20, 2001

(54) COMBINATION CUP AND CELLULAR PHONE HOLDER

(75) Inventor: Ivan Nelson Wakefield, Cary, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/033,288

(22) Filed: Mar. 2, 1998

Related U.S. Application Data

(62) Division of application No. 08/643,705, filed on May 6, 1996, now Pat. No. 5,745,565.

(51) Int. Cl.[7] .................. B60R 7/04; B60R 11/02
(52) U.S. Cl. ............... 224/542; 220/23.89; 220/735; 220/737; 224/544; 248/311.2; 379/446; 379/455
(58) Field of Search ............. 248/311.2; 224/906, 224/542, 544, 929; 220/735, 736, 737, 738, 739, 23.87, 23.89; D14/251, 252, 253; 379/455, 446

(56) References Cited

U.S. PATENT DOCUMENTS

| | | | |
|---|---|---|---|
| D. 311,919 | | 11/1990 | Klaczak et al. .......... D14/250 |
| D. 316,999 | | 5/1991 | Sarff ......................... D14/253 |
| D. 327,070 | | 6/1992 | Watanabe ................. D14/251 |
| D. 360,524 | | 7/1995 | Snyder ...................... D3/224 |
| D. 402,666 | * | 12/1998 | Golder ...................... D14/253 |
| 2,284,452 | * | 5/1942 | Simons ...................... 220/736 |
| 2,329,512 | * | 9/1943 | Clifford, Jr. .............. 220/737 |
| 2,601,767 | * | 7/1952 | Wall .......................... 220/713 |
| 4,303,170 | * | 12/1981 | Panicci ...................... 220/713 |
| 4,596,370 | * | 6/1986 | Adkins ...................... 224/425 |
| 4,629,153 | * | 12/1986 | Marcum ..................... 224/926 |
| 4,681,239 | * | 7/1987 | Manns et al. ............. 220/739 |
| 4,702,385 | * | 10/1987 | Shillington et al. ...... 220/23.89 |
| 4,720,023 | * | 1/1988 | Jeff ............................ 220/739 |
| 4,721,216 | * | 1/1988 | Kinder ...................... 215/100.5 |
| 4,821,931 | | 4/1989 | Johnson .................... 224/42.42 |
| 4,852,843 | * | 8/1989 | Chandler ................... 224/926 |
| 4,919,281 | * | 4/1990 | Buist ......................... 224/926 |
| 4,928,848 | * | 5/1990 | Ballway .................... 220/703 |
| 5,038,982 | | 8/1991 | Salveson et al. ......... 224/42.11 |
| 5,052,649 | * | 10/1991 | Hunnicutt ................. 224/926 |
| 5,088,673 | * | 2/1992 | Chanlder ................... 224/926 |
| 5,108,059 | * | 4/1992 | Curtis ....................... 248/311.2 |
| 5,174,534 | * | 12/1992 | Mitchell ................... 224/926 |
| 5,180,088 | * | 1/1993 | Angeli ....................... 224/926 |
| 5,230,016 | | 7/1993 | Yasuda ...................... 379/58 |
| 5,273,182 | * | 12/1993 | Laybourne ................ 215/228 |
| 5,511,755 | * | 4/1996 | Spykerman ............... 224/926 |
| 5,651,523 | * | 7/1997 | Bridges ..................... 248/311.2 |
| 5,655,742 | * | 8/1997 | Whitman ................... 248/311.2 |
| 5,676,340 | * | 10/1997 | Ruhnau ..................... 248/311.2 |
| 5,702,041 | * | 12/1997 | Sun et al. .................. 224/926 |
| 5,745,565 | * | 4/1998 | Wakefield ................. 379/446 |
| 5,897,041 | * | 4/1999 | Ney et al. ................. 224/926 |
| 5,960,984 | * | 10/1999 | Weston ...................... 220/23.89 |
| 5,979,724 | * | 11/1999 | Loewnethal, Jr. et al. ....... 224/483 |

FOREIGN PATENT DOCUMENTS

| | | | |
|---|---|---|---|
| 1115669 | 1/1992 | (CA) | ............ B60R/7/04 |
| 03276832 | 12/1991 | (EP) | ............ B60N/3/10 |
| 5112181 | 5/1993 | (EP) | ............ B60R/7/04 |
| 437237A | 2/1992 | (JP) . | |
| 190800 | * 7/1998 | (JP) . | |

* cited by examiner

Primary Examiner—Stephen P. Garbe
(74) Attorney, Agent, or Firm—Coats & Bennett, PLLC

(57) ABSTRACT

A combination beverage and cellular phone holder adapted for insertion into an existing vehicle beverage holder to convert it to a multi-unit holder and firmly position the cellular phone within the vehicle in a convenient and accessible position.

14 Claims, 2 Drawing Sheets

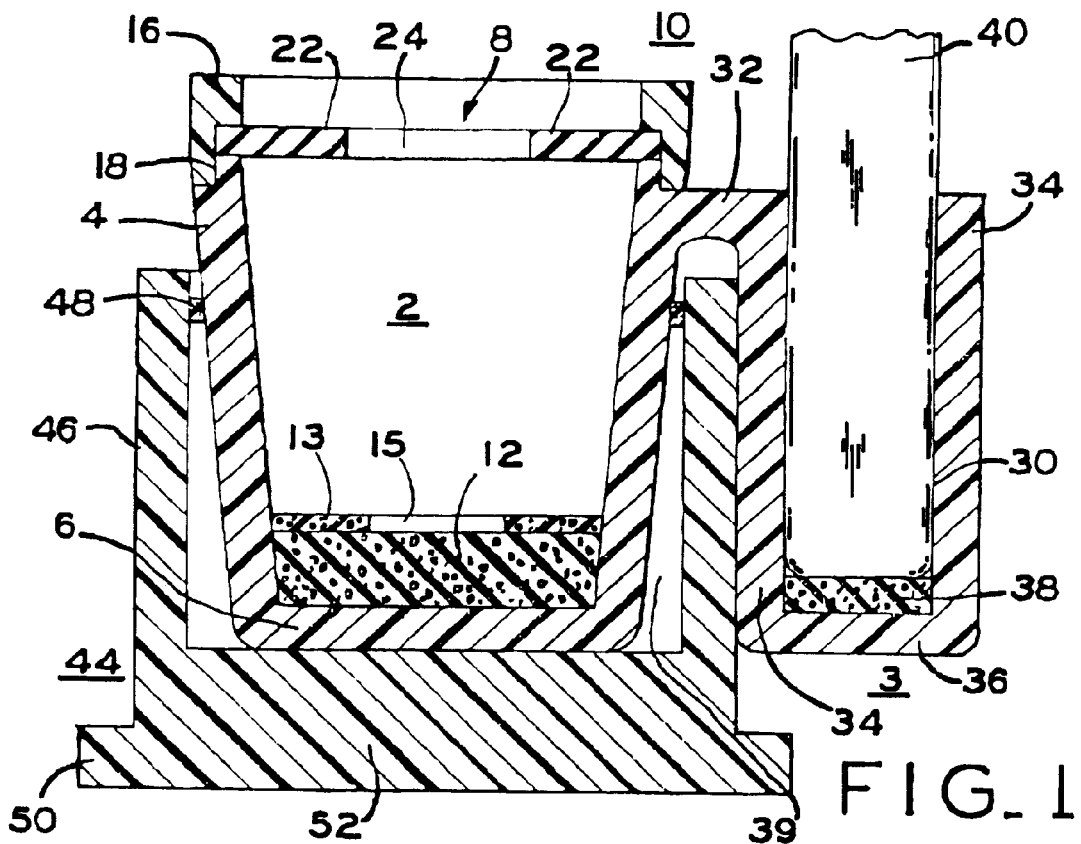
FIG_1
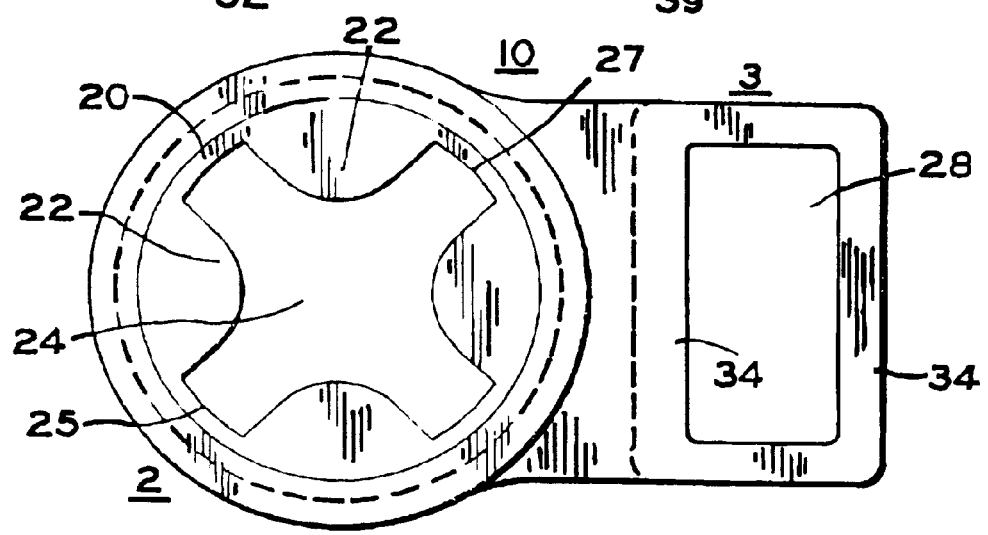
FIG_2

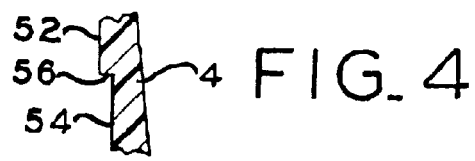
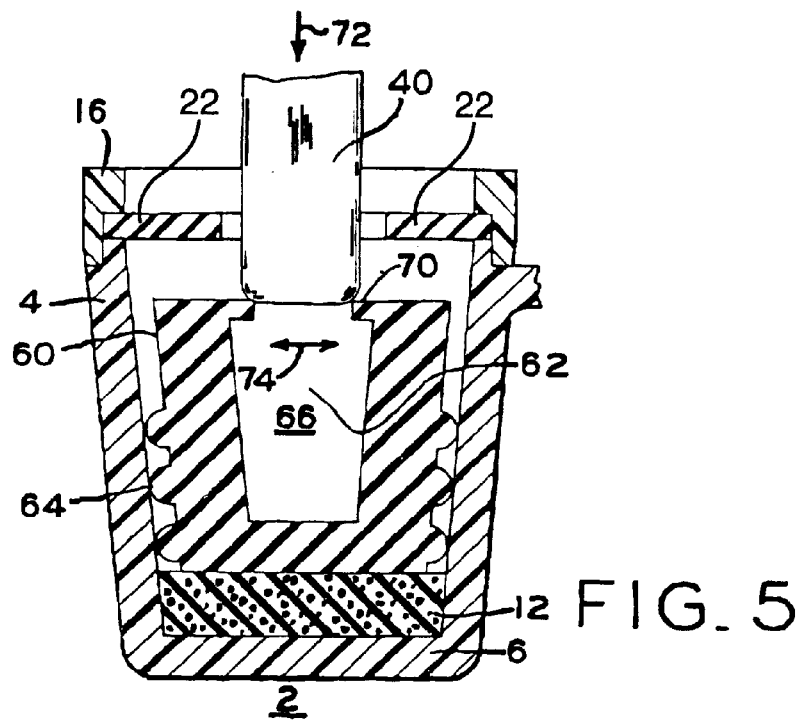
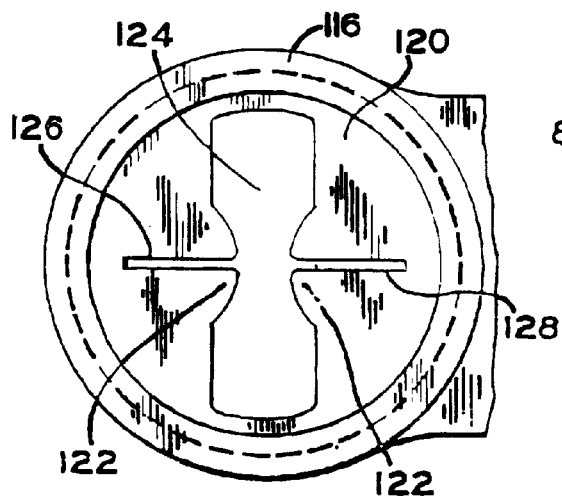
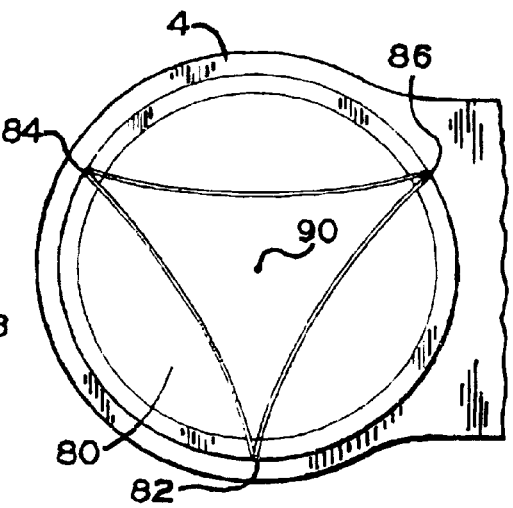

COMBINATION CUP AND CELLULAR PHONE HOLDER

REFERENCE TO RELATED APPLICATIONS

This application is a division of Application No. 08/643,705, filed May 6, 1996, now U.S. Pat. No. 5,745,565.

BACKGROUND OF INVENTION

Personal use portable communicators such as cellular telephones have become increasingly popular, miniaturized and ubiquitous. It has become common for portable cellular telephones to be carried in automobiles for emergency and other use. Moreover, it has also become common for people to utilize cellular telephones during operation of the automobile including not only during stops at traffic lights but also during motion of the vehicle. As a result, the problem of positioning a cellular telephone or other portable communicator in a position readily available to the driver has presented a problem not only of convenience but of safety in that drivers who are forced to divert their gaze from the road to locate and grasp a cellular telephone present traffic hazards not only to themselves but to persons in other vehicles.

While new automobile designs have included cellular telephones positioned on and secured by special holders or cradles on the console or in other fixed positions within convenient reach of the vehicle operator, many vehicles are not so equipped such that the driver often gropes for the cellular telephone positioned on the seat, floor or the glove compartment. It is accordingly desirable to be able to retrofit vehicles such as automobiles with a stationary holder for a cellular telephone which is positioned within easy reach of the driver and which provides a positive holding force to retain the cellular telephone in the holder. It is important that the driver be able to retrieve and reposition the cellular telephone in the holder without diverting his gaze from the road ahead, particularly under driving or traffic conditions.

OBJECTS AND SUMMARY OF THE INVENTION

Accordingly it is an object of the present invention to provide a conveniently positionable readily accessible cellular phone holder for use in vehicles.

It is another object of the present invention to provide a combination beverage and cellular phone holder suitable for selectively replacing a vehicle beverage holder.

It is still another object of the present invention to provide a combination beverage and phone holder which may be readily retrofitted onto existing vehicles.

In order to obtain the above and other related objectives, in carrying out the present invention in one form thereof, a combination beverage and cellular phone holder is provided for insertion into and retention by existing beverage holders and including an integral beverage portion and cellular phone portion each forming a pocket with an opening at the top and with the beverage holder dimensioned for insertion into and retention by existing beverage holders. A flexible partial closure at the upper end provides retaining means for the beverage or phone. More particularly, the walls of the replacement beverage holder may be tapered and the bottom of the replacement beverage cup holder weighted to provide positive positioning and retention of the combination holder. A spring loaded compressible insert provides tension around the cellular phone to positively hold the phone in position on the phone holder.

BRIEF DESCRIPTION OF DRAWINGS

FIG. 1 is a cross section view of the invention positioned within an existing beverage holder.

FIG. 2 is a top view of FIG. 1 without the existing beverage holder and without the cellular phone in order to better illustrate details of the present invention.

FIG. 3 shows an alternate configuration for the resilient seal used on the replacement beverage holder.

FIG. 4 shows a portion of the tapered walls of the replacement beverage holder of FIG. 1.

FIG. 5 is a cross section view showing details of a resilient retention arrangement suitable for use with the invention of FIGS. 1–4.

FIG. 6 is an alternate spring arrangement for the retaining spring shown in FIG. 5.

Referring first to FIGS. 1 and 2, a combination beverage and phone holder 10 according to a first embodiment of the present application is shown including a beverage holder 2 and phone holder 3. Beverage holder 2 is comprised of continuous sidewalls 4 including side portions 4a and 4b which may be tapered. Beverage holder 2 is further comprised of a bottom 6 and an open top end 8. Open top end 8 is partially closed by resilient member 20 which is secured in place by retaining rim 16 and cooperating portion 18 on the upper portion of side walls 4 which may include protrusions for a snap fit or which could utilize threads. Resilient member 20 may be configured as shown in FIG. 2 including a plurality of resilient protrusions or fingers 22 defining a deformable central opening 24 suitable for receiving and securing a beverage can or a cup containing a beverage. Alternatively, the diagonally opposed rim segments or sections 25 and 27 define a generally rectangular opening suitable for retaining a cellular telephone in the position determined by the existing vehicle beverage holder 44 in the convenient, accessible to the driver position of that beverage holder.

Connected to, and integral with, beverage or cup holder 2 is cellular phone or portable communication unit holder 3 connected by bridging member 32 all of which may be cast in an integral form of a suitable material such as a thermoplastic rubber such as that sold and identified as Santoprene. Phone holder 3 defines a central pocket 28 (see FIG. 2) of generally rectangular cross section formed by side walls 34 and bottom 36. Side walls 34 include side wall portions 34a and 34b. Preferably, phone holder 3 should be generally dimensioned to receive and support a cellular telephone, personal digital assistant or similar sized device. According to the present invention, the dimensions of the phone holder 3 may be selected and designed to accommodate and support a wide range of cellular phone and like devices.

A resilient cushioning member 38 positioned above bottom 36 (see FIG. 1) provides a resilient resting base for portable communication unit 40 which may be a cellular phone or radar detector. A similar foam rubber cushion 13 may be provided in the bottom of beverage holder 2 and may include a slot 15 for receiving the bottom of cellular phone 40 in those situations where the cellular phone is inserted into beverage holder 2 between diagonally opposed rim segments 25 and 27. It is, of course, possible that because of the optimum existing positioning of automotive cup holder 44 in the vehicle that it may be desirable to position cellular phone 40 in the same position within beverage holder 2 in which case it is centered and retained by resilient member 20 and slot 15.

Combination beverage and phone holder 10 is positioned on, and secured by, existing automotive cup holder 44 which includes side walls 46 and bottom 52 with a resilient member 48 adjacent the open end thereof. As shown, side walls 46 include side wall portions 46a and 46b. Automotive cup holder 44 may include slide or support 50 for anchoring and/or moveably supporting automotive cup holder 44 adjacent the driver's position such as on a console. It is to be noted that beverage holder 2 is inserted within automotive cup holder 44 with phone holder 3 positioned adjacent or outside walls 46 of the automotive cup holder with bridge member 32 overlying the top and open end of the automotive cup holder. An opening or separation 39 is formed by the sidewall portion 4b of beverage holder 2 and sidewall portion 34a of phone holder 3. The sidewall portion 4b of the beverage holder 2, sidewall portion 34a of the phone holder 3, and bridging member 32 form a "U-shaped" section that straddles the sidewall portion 46b of automotive cup holder 44 securing combination beverage and phone holder 10 in place and in effect supplanting or retrofitting automotive cup holder 44 and replacing it with combination beverage and phone holder 10. It is possible, as described above, to utilize beverage holder 2 to retain cellular phone 40 such that if it is not desired to simultaneously provide both a beverage holder and phone holder, phone holder assembly 3 can be dispensed with.

An alternate configuration of resilient member 20 is shown in FIG. 3. Referring to FIG. 3, resilient member 120 secured in place by threaded rim 116 includes protrusions or fingers 122 configured to provide a generally rectangular central slot 124 with narrow orthoganal slots 126 and 128 providing a design that can more readily grip and position a cellular telephone. This design may be desirable if phone holder 3 is not included.

As shown in FIG. 4, sidewalls 4 of beverage holder 2 may include a plurality of circumferential ridges 56 extending in a generally horizontal position between sidewalls 52 and 54 having slightly differing diameters, with the diametere of sidewall 54 being slightly less than the diameter of sidewall 52. Such a configuration may assist in the positive positioning of beverage holder 2 within resilient member 22 of cup holder 44.

In FIG. 5, a tapered insert 60 is positioned within interior 62 of cup holder 4 proximate to bottom 6 of the cup holder and secured to weighted bottom member 12. Tapered insert 60 is formed of resilient material such as Santoprene. Ridges 64 around the bottom region 66 of the exterior of insert 60 contact the interior surface of side walls 4 to secure insert 60 in place. Rim 70 at the open upper end of insert 60 projects inwardly such that the insertion downward of transceiver 40 as indicated by arrow 72 presses against the rim forcing the opposing portions of the rim apart as indicated by arrow 74 providing a positive holding force for transceiver 40 when inserted into and positioned within and contacting the interior walls of the bottom portion of tapered insert 60.

Referring next to FIG. 6. Insert 60 is replaced by one or more springs 80 which can be a single length of spring material secured at points 82, 84 and 86 about axis 90 equidistant from each other along the interior of side walls 4. The deformation of spring 80 upon the insertion of transceiver 40 will cause the spring to resiliently hold the transceiver within side walls 4 to provide a positive holding force.

While the present invention has been described with respect to certain preferred embodiments thereof, it is to be understood that numerous variations in the details of construction, the arrangement and combination of parts, and the type of materials used may be made without departing from the spirit and scope of the invention.

What I claim is:

1. A combination beverage container and portable communication unit holder comprising:

a beverage holder having an opening to receive a beverage container; and an adapter disposed within said beverage holder, said adapter having a cavity sized to receive a portable communication unit and a resilient member positioned at an upper end of said beverage holder.

2. The unit of claim 1, wherein said adapter is an insert.

3. The unit of claim 1, wherein said resilient member is a spring extending across the upper end of said beverage holder.

4. The unit of claim 3, wherein said spring is anchored at at least three points within said beverage holder.

5. The unit of claim 4, wherein said at least three points are spaced about the interior of said beverage holder.

6. The unit of claim 5, wherein said points are substantially equidistant from each other about the axis of said beverage holder.

7. A combination beverage container and portable communication unit holder comprising:

a. a beverage holder having an opening to receive a beverage container; and b. an insert sized to fit within said opening such that a top edge of said insert is positioned below an upper edge of said beverage holder, said insert having a cavity with sidewalls and a bottom region and sized to receive a portable communication unit, said insert further having an outer surface sized to frictionally engage an inner surface of said beverage holder.

8. The unit of claim 7, wherein said insert is frictionally contained within said beverage holder.

9. The unit of claim 8, further including ridges extending outward from said insert for contact said beverage holder.

10. The unit of claim 7, wherein said beverage holder includes a bottom section for supporting said insert.

11. The unit of claim 7, wherein said insert is constructed of a resilient material and said opening is smaller than the portable communication unit such that upon insertion of the unit, the insert conforms to the portable communication unit.

12. The unit of claim 7, wherein said insert has a tapered outer surface.

13. The unit of claim 7, further including a rim integral with said insert and positioned along an upper end of said cavity forming an opening narrower than said cavity.

14. A method of maintaining a portable communicator within a holder, the holder having an open upper end and a closed lower portion, a resilient member positioned at the open upper end having an opening, and an insert positioned between the open upper end and the closed lower portion having an interior section, the method comprising the steps of:

grasping the portable communicator;

inserting a first end of the portable communicator into the open upper end and into the interior section of the insert;

deforming the resilient member thereby providing a positive holding force around the portable communicator and maintaining the positioning of the portable communicator within the holder; and releasing the portable communicator and retaining the communicator within the holder.

\* \* \* \* \*